United States Patent Office 3,479,750
Patented Nov. 25, 1969

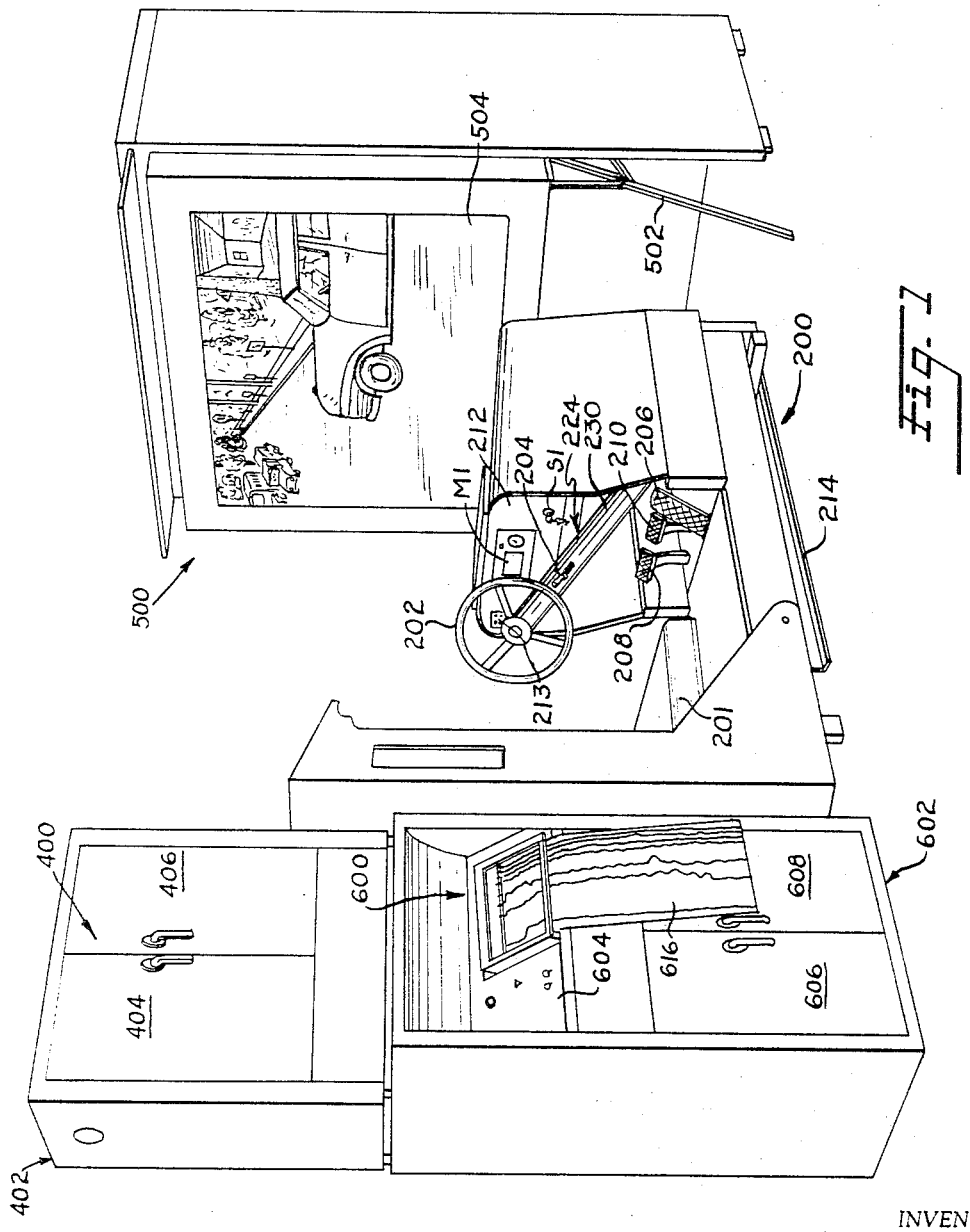

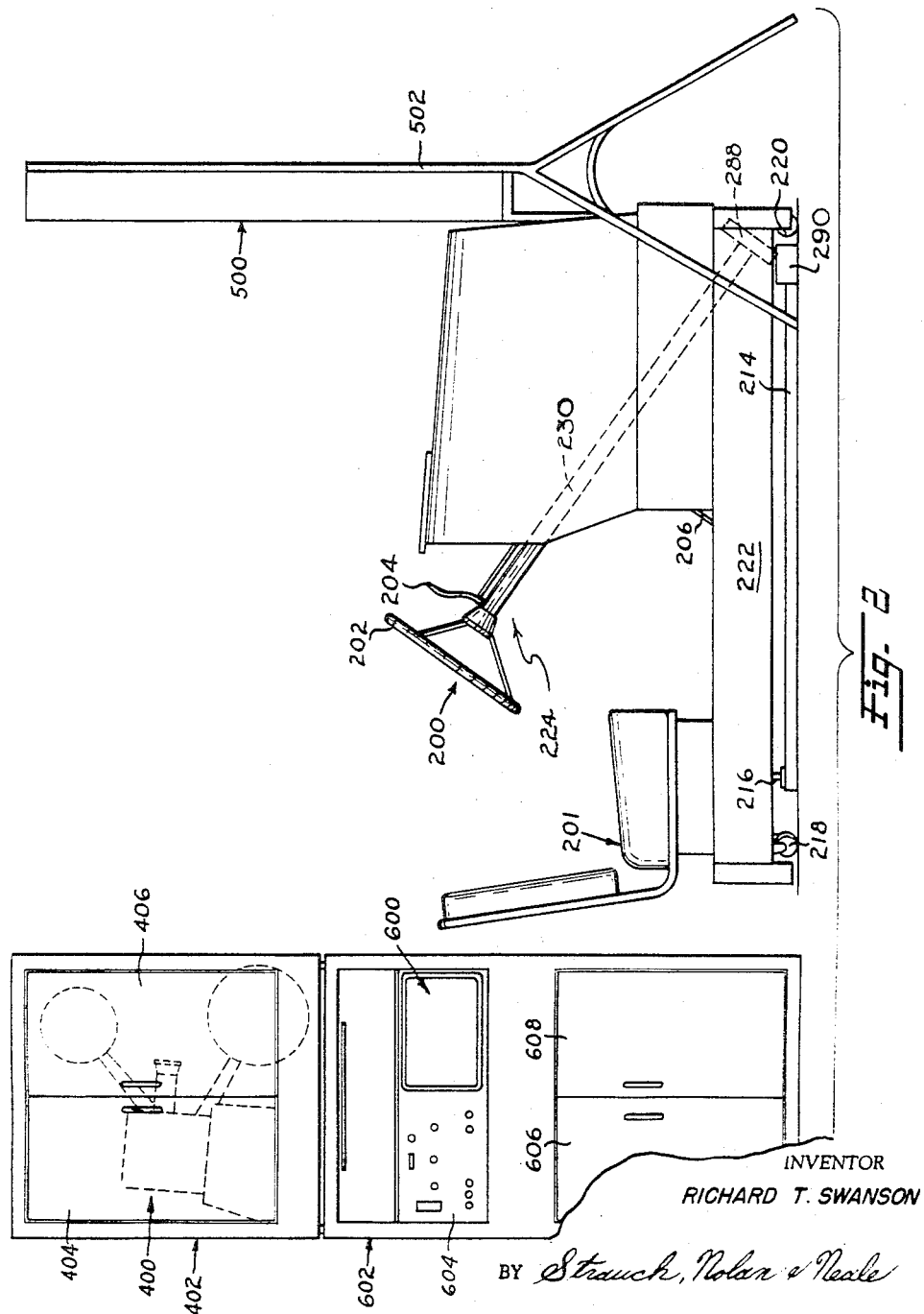

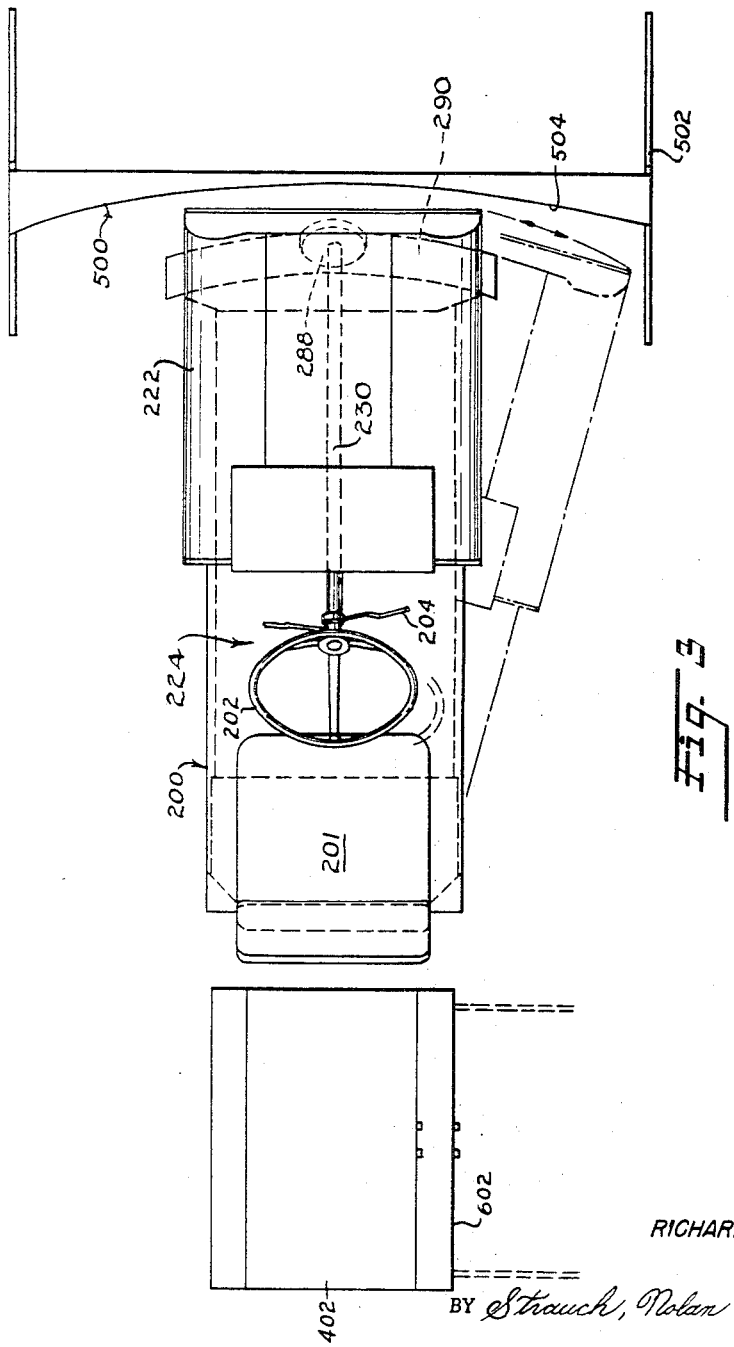

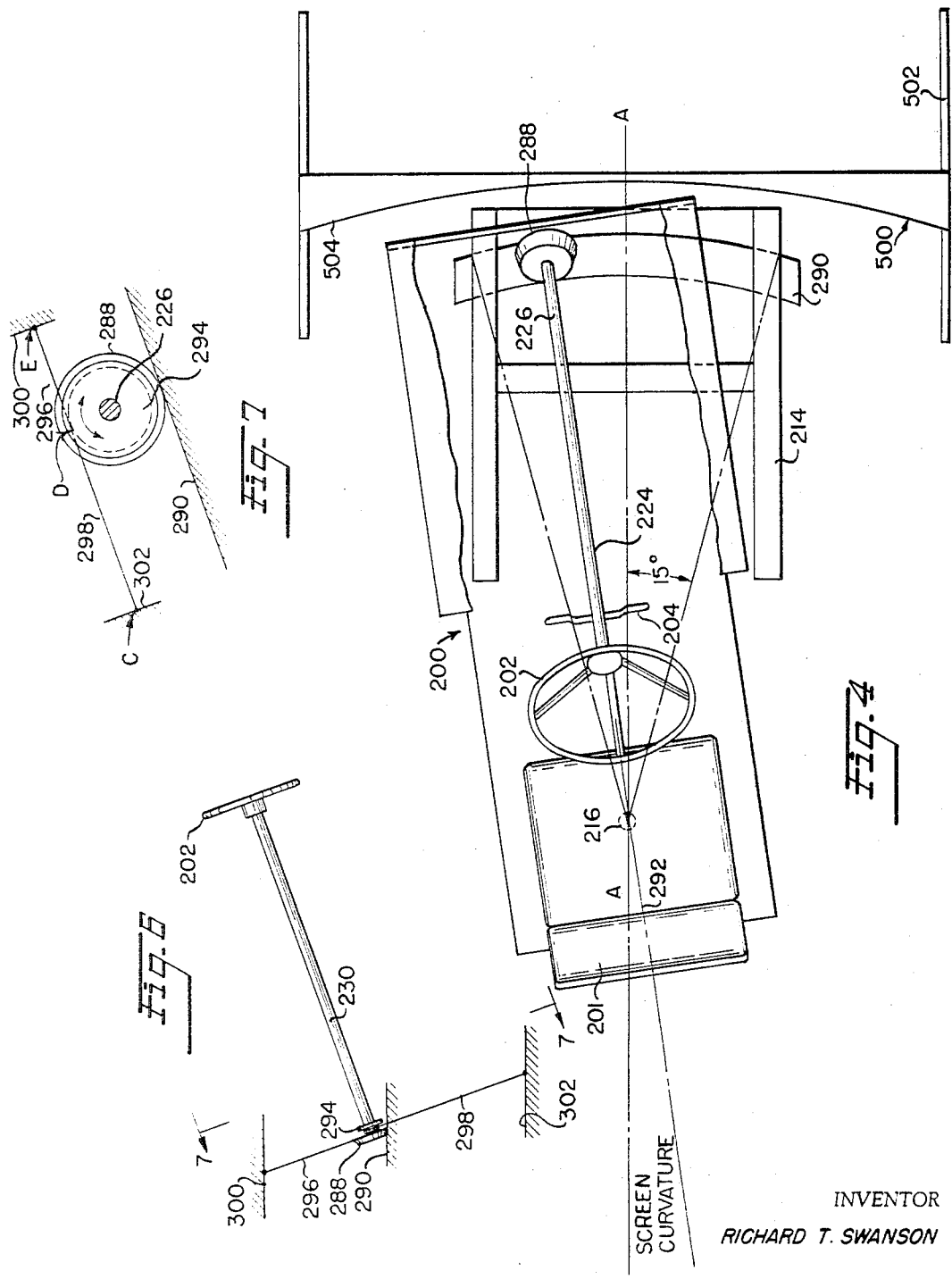

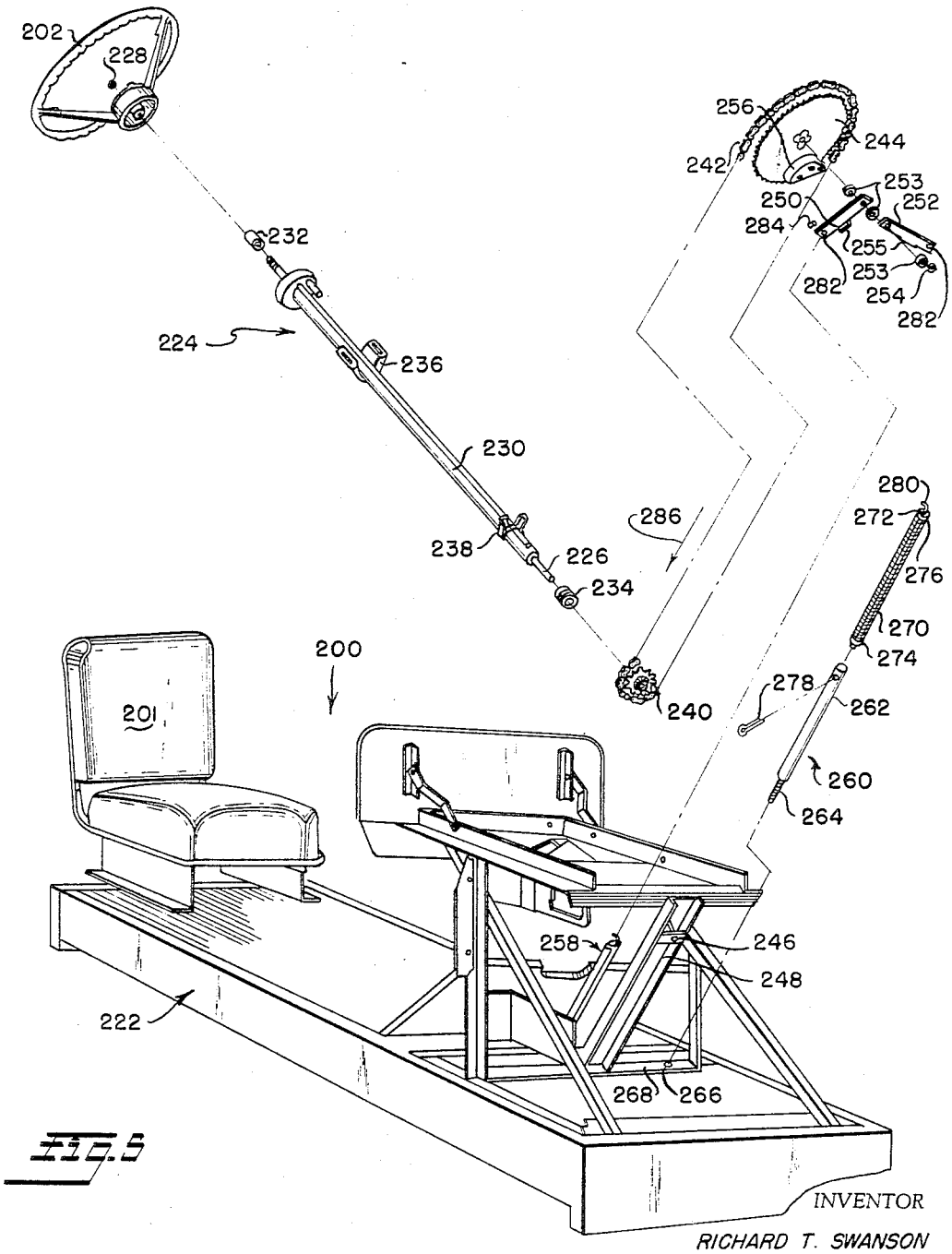

3,479,750
AUTOMOTIVE VEHICLE SIMULATOR FOR DEMONSTRATING AUTOMATIC SELF-CENTERING OF STEERABLE AUTOMOBILE WHEELS
Richard T. Swanson, Lakewood, N.Y., assignor, by mesne assignments, to Aetna Casualty and Surety Company, a corporation of Connecticut
Filed Feb. 6, 1964, Ser. No. 342,977
The portion of the term of the patent subsequent to Nov. 25, 1983, has been disclaimed
Int. Cl. G09b 9/02
U.S. Cl. 35—11                3 Claims

ABSTRACT OF THE DISCLOSURE

The invention disclosed herein presents a novel type of automotive simulator vehicle which allows pivotal movement of the simulator and automatic self-centering action so that the operator can obtain the equivalent sensation as that of an actual vehicle. Pivotal movement of the simulator is effected by using a friction wheel on an arcuate track, wherein the friction wheel is responsive to the steering wheel of the simulator. The automatic centering action is accomplished by positioning resilient coil springs within the frame of the simulator. The springs operate in opposition one with the other biasing the simulator to a neutral position whenever a deviation from neutral is effected by the operator.

---

This invention relates to simulators and, more particularly, to devices for simulating the operation of dirigible automotive vehicles. Specifically, this invention relates to novel vehicle operation simulators arranged to duplicate the automatically self-centering action of a dirigible vehicle.

Copending application No. 196,290 filed May 21, 1962, now U.S. Patent No. 3,251,142, by Anatolijus Jazbutis discloses and claims a novel vehicle operation simulator including a pivotally mounted simulated vehicle and conventionally appearing steering mechanism arranged to pivot the simulated vehicle in response to manipulation of the steering wheel. This arrangement gives the simulator operator much the same sensation he receives in steering an actual vehicle, so that his reactions will be much like those he would have in an actual situation.

There is, however, a disadvantage to the above-described arrangement which can best be understood by considering the operation of an actual vehicle. Dirigible vehicles such as automobiles, for example, are commonly designed to be self-centering. That is, they are so arranged that the steering mechanism is normally in a neutral or centered configuration in which it so directs the vehicle's steerable wheels that the vehicle proceeds in a straight path.

Curves and corners are negotiated by manipulating the steering wheel to pivotally displace the steerable wheels from their neutral positions and cause the vehicle to move in a curvilinear path. Such vehicles are also so arranged that, when the operator terminates his steering effort, as by releasing the steering wheel, the steering mechanism and steerable wheels automatically return to their centered configurations causing the vehicle to again move in a straight path.

The vehicle operation simulator disclosed in application No. 196,290 does not make provision for duplicating the sensations provided by the above-discussed self-centering operation of an actual dirigible vehicle. Because of this, the simulator operator retains a strong feeling that he is in an artificial situation as he operates the simulator; and his reactions are therefore unlike those which he would have in actual circumstances.

In the novel vehicle operator simulators of the present invention, the sensations arising from the self-centering operation of an actual dirigible vehicle are duplicated by employing a pivotable simulated vehicle, as in the simulator disclosed in application No. 196,290, steering mechanism operable to pivot the simulated vehicle, and a novel self-centering mechanism including two oppositely acting compression springs or other elastic members to normally maintain the steering mechanism in, and to restore it to, its neutral or centered configuration. In the preferred embodiment of this invention, the steering mechanism is so constructed that, when the steering mechanism is centered, the simulated vehicle is also centered relative to a screen on which a road scene is displayed, giving the simulator operator the sensation he is driving straight along the road depicted in the projected scene.

Another novel feature of the present invention is the employment of restraining members between the pivotable vehicle and its base (or other fixed points) to prevent displacement of the vehicle's centered or neutral position relative to the base on which the vehicle is mounted.

The main advantage of the present invention is that it materially enhances the feeling of realism experienced by the driver and concomitantly reduces his feeling that he is in an artificial situation while operating the simulated vehicle. This makes it possible to more accurately evaluate the reactions of the operator and to more accurately judge his capabilities to react correctly in actual driving situations.

Another advantage of the present invention is that accidental displacement of the simulated vehicle's neutral axis relative to its base is precluded. This insures that the vehicle remains properly aligned with the screen on which the road scene is displayed, preventing the unrealistic sensations which the simulator operator would experience if the screen and vehicle were misaligned. For example, if a straight road were displayed on the screen and the simulated vehicle centered to proceed along the road, unrealistic and undesirable symptoms would be experienced by the operator if, due to displacement of its neutral position, the vehicle appeared to be traveling at an angle to the road.

From the foregoing, it will be apparent that one object of the present invention resides in the provision of novel, improved automotive vehicle operation simulators which substantially increase the driver's sensation of driving a real vehicle under actual circumstances.

In conjunction with the preceding object, another and specific object of this invention is the provision of vehicle operation simulators which duplicate the sensations experienced by a driver in steering an actual dirigible vehicle.

Another specific object of the present invention is the provision of dirigible vehicle operation simulators provided with novel mechanisms for duplicating the steering sensations experienced in steering actual dirigible vehicles.

A further specific operation of the present invention resides in the provision of dirigible vehicle operation simulators comprising a base, a normally centered simulated vehicle pivoted on the base, and novel vehicle restraining mechanism for preventing displacement of the simulated vehicle's neutral axis relative to the base.

Additional objects and further novel features of the present invention will become more fully apparent from the appended claims and as the ensuing detailed description and discussion proceeds in conjunction with the accompanying drawing, in which:

FIGURE 1 is a perspective view of a dirigible vehicle simulator embodying the present invention;

FIGURE 2 is a side elevation of the simulator of FIGURE 1;

FIGURE 3 is a top plan view of the simulator;

FIGURE 4 is a schematic top plan view of a simulated automotive vehicle and screen employed in the vehicle operation simulator of FIGURE 1, illustrating the simulated vehicle steering mechanism and the mechanism provided to pivot the simulated vehicle relative to the screen;

FIGURE 5 is an exploded perspective view of the components of the novel mechanism provided by the present invention for duplicating the sensations experienced in steering an actual dirigible vehicle;

FIGURE 6 is a diagrammatic view of the novel mechanism provided by the present invention for preventing displacement of the simulated vehicle's neutral axis; and FIGURE 7 is a section through the apparatus of FIGURE 6, taken substantially along line 7—7 of the latter figure.

Referring now to FIGURE 1, the novel vehicle operation simulator of the present invention includes a simulated vehicle 200, a motion picture film projector 400 (see FIGURE 2), a screen 500, and a strip chart recorder 600. Recorder 600 is housed in a cabinet 602 together with a control unit 604. Cabinet doors 606 and 608 enable access to storage shelves (not shown) below control unit 604. Projector 400 is housed in a cabinet 402 supported on cabinet 602 and provided with doors 404 and 406 enabling access to the projector.

Simulated vehicle 200 is equipped with a seat 201 and conventional operator-actuated vehicle controls such as a steering wheel 202, a gear shift lever 204, an accelerator 206, a clutch pedal 208, and a brake pedal 210. Vehicle 200 also includes an instrument panel 212 in which are mounted conventional automotive instruments such as an ignition switch S1, a speedometer M1, and a push button cluster 213 for simulating operation of an automatic transimission. The vehicle is pivotally mounted on a base 214 and pivots in response to operator manipulations of steering wheel 202 to increase the operator's sensation of driving an actual vehicle.

Projector 400 is, in the illustrated exemplary system, a 16 millimeter sound projector and projects a film which includes a series of stimuli such as traffic hazards and incidents which might be encountered in travelling along a highway arranged in a logical order. For example, a sequence may show putting an automobile in motion followed by turning a corner, approaching a traffic light, nearing a pedestrian, etc. Or the scene may present a more elementary sequence such as starting the vehicle motor, releasing the parking brake, shifting through the gear range with accompanying clutch manipulations, and subsequent braking to bring the vehicle to a halt.

Passage of the film through the projector: (1) conditions various control circuits which may then be activated by manipulation of one or a combination of vehicle controls, and (2) presents a series of stimuli to the vehicle operator to which he must respond by appropriate manipulation of the selected control or controls in order to avoid a hazardous situation.

For example, the film may include a scene of a child darting in to the street immediately in front of the simulated vehicle. During the initial portion of the scene, the film will cause conditioning of a circuit that may be completed by hard depression of brake pedal 210. The operator viewing the scene is, at nearly the same time, stimulated to apply the brake as hard as possible to avoid colliding with the child.

In order to permanently record the operator's reactions, the various vehicle controls are connected through the circuits referred to above to recorder 600. Recorder 600 is preferably a two-speed strip chart recorder designed to accommodate a strip chart 616 on which the operator's manipulations of accelerator 206, steering wheel 202, and brake pedal 210 are continuously recorded. To aid in the interpretation of the foregoing recordings, an indication of the start of each even, such as the child darting into the street, is also recorded.

The screen 500 on which the road scene is displayed may be mounted on a stand 502 as shown in FIGURE 1 or may be hung on a wall. The screen surface 504 (FIGURE 4) has a substantial degree of concavity which enhances the realism of the scene displayed upon it.

Details of the construction and operation of the vehicle operation simulator are described in copending applications 196,290 and 93,538 to which reference may be had if desired.

Referring now to FIGURES 2–4, simulated vehicle 200 is, as was pointed out above, pivotally mounted on a base 214 so that, as the simulator operator manipulates steering wheel 202, vehicle 200 will pivot substantially in the manner of a real automobile, increasing the sensation of realism experienced by the simulator operator. Referring now specifically to FIGURE 2, vehicle 200 is pivotally mounted on a pivot post 216 which extends upwardly from base 214 at a point which is substantially coincidental with the center of the operator's seat 201. Casters 218 and 220, fixed to the bottom of the body 222 of the simulated vehicle, support the vehicle 200 as it pivots about post 216. Although but two casters are shown, it is to be understood that normally four such casters would be employed, one at each of the four corners of the vehicle. The casters are of conventional construction and may be attached to the vehicle body or frame 222 in any desired manner, as, for example, by bolts (not shown).

Pivotal movement of simulated vehicle 200 about pivot post 216 is effected by the steering mechanism illustrated in FIGURE 5 and identified generally by reference 224. Steering mechanism 224 includes sterring wheel 202, which is fixed to the upper end of a downwardly inclined, elongated shaft 226 as by a nut 228. Shaft 226 is rotatably supported in a tubular housing 230 by bearings 232 and 234 so that manipulation of steering wheel 202 produces a concomitant rotary movement of shaft 226. Housing 230 is cradled in brackets 236 and 238 bolted or otherwise attached to vehicle frame 222 in the orientation illustrated in FIGURES 1, 2 and 3. The components of steering mechanism 224 just described are standard parts of current model automobiles manufactured by the Ford Motor Company in this country and are not believed to require further description.

One of the novel and important features of the present invention is the provision of mechanism for duplicating the steering action of an actual dirigible automotive vehicle by normally maintaining steering wheel 202 in a centered or neutral position and for restoring it to the neutral position concurrently with the termination of a manipulative displacement of the steering wheel from its neutral position. Normally, this is when it is released by the driver to restore the simulated vehicle from a curvilinear to a straight path.

This novel mechanism includes a toothed sprocket 240 keyed or otherwise fixed to the lower end of rotatably mounted shaft 226. Sprocket 240 is drive-connected by a roller chain 242 to a spur gear or sprocket 244 rotatably supported in any desired manner from vehicle frame 222—for example, on a stub shaft 246 fixed to upwardly extending frame member 248 as shown in FIGURE 5.

The stub shaft 246 supporting spur gear 244 also extends through one end of each of two brackets 250 and 252 axially secured to the shaft by washers 253 and nut 254 and provided with normally extending, integral flanges 255 abutting a generally triangular support 256 bolted or otherwise fixed to spur gear 244. The opposite ends of brackets 250 and 252 are fixed to the steering wheel return assemblies 258 and 260 illustrated in FIGURE 5.

Each of the assemblies 258 and 260 includes a tubular spring housing 262 with a closed bottom to which a threaded stud 264 is welded or otherwise fixed. Studs 264 extend through apertures 266 in a lateral vehicle frame member 268. Nuts (not shown) threaded on the studs fix the housings to the frame member 268 on opposite sides and equidistantly spaced from a vertical plane including the axial centerline of shaft 226.

Disposed in each housing 262 is a coil spring 270 through which an elongated rod 272 extends. Slidably mounted on rod 272 at opposite ends of spring 270 are circular plates or washers 274 and 276. Spring 270 and washers 274 and 276 are axially retained on rod 270 as by the upset lower end of the rod; and the assembled rod, spring, and washers are retained in tubular housing 262 by a cotter key 278 extending through the housing adjacent its upper end and above washer 276. Cotter keys 278 form stops limiting the upward movement of washers 276 without impeding the upward movement of the elongated rods 272.

The upper end portions 280 of the rods 272 are bent at right angles and extend through apertures 282 in the lower ends of the brackets 250 and 252. They are retained in place in pivotally assembled relation with brackets 250 and 252 by retainers 284.

The operation of the above-described steering wheel centering mechanism is as follows:

With the steering wheel in its normal or neutral position, springs 270 are each slightly compressed. Since the two springs 270 are identical, they thus exert equal, oppositely directed tensile forces through rods 272, brackets 250 and 252, and support 256 on sprocket 244 when, in the absence of operator manipulation, steering wheel 202 is in its centered or neutral position. Therefore, in the absence of operator manipulation of steering wheel 202, springs 270 are effective to resiliently retain the steering wheel in its centered or neutral position.

When the vehicle simulation operator manipulates steering wheel 202 (for the sake of explanation it will be assumed that steering wheel 202 is rotated in a counterclockwise direction as viewed in FIGURE 5 to cause simulated vehicle 200 to bear to the right), the counterclockwise rotation of steering wheel 202 (as viewed in FIGURE 5) effects counterclockwise rotation of shaft 226 and sprocket 240, causing roller chain 242 to move in the direction indicated by arrow 286 in FIGURE 5. This effects counterclockwise rotation of spur gear 244 causing the lower end of bracket 252 to move generally upwardly. This pulls the rod 272 (of assembly 260) fixed to the lower end of bracket 252 and the associated washer 274 upwardly, compressing spring 270 against washer 276 which is prevented from moving upwardly by cotter key 278. This stores potential energy in spring 270. It will be noted that support 256 pivots in a counterclockwise direction away from bracket 250 and thus no effect on the position of rod 272 of assembly 258.

When the vehicle operation simulator operator releases steering wheel 202, the potential energy stored in spring 270 is released in the form of kinetic energy, and the spring 270 drives washer 274 and rod 272 downwardly, rotating bracket 252 and spur gear 244 clockwise. Clockwise movement of spur gear 244, through the linkage described above, restores steering wheel 202 in a clockwise direction to its centered or neutral position where its movement is halted by the spring 270 of second steering wheel return assembly 258.

The operation is the same, but in a reverse direction, if steering wheel 202 is rotated in a clockwise direction (as viewed in FIGURE 5) to cause simulated vehicle 200 to bear to the left.

From the foregoing, it will be apparent that the mechanism described above duplicates the action of the steering mechanism in an actual dirigible vehicle such as an automobile. This is extremely important since it materially heightens the feeling of realism experienced by the simulator operator, causing his reactions to more nearly duplicate those which he would have in an actual driving situation.

As indicated above, manipulation of steering wheel 202 causes pivotal movement of simulated vehicle 200 about pivot post 216, an innovation which also contributes, to a significant extent, to the feeling of realism experienced by the simulator operator. To effect pivotal movement of vehicle 200 about pivot post 216, a friction wheel 288 is keyed or otherwise fixed to the lower end of shaft 226 adjacent sprocket 240. Friction wheel 288 engages an arcuate track 290 incorporated in the vehicle base 214. As steering wheel 202 is rotated by the simulator operator, friction wheel 288 rolls in an arcuate path along track 290. Suitable stops (not shown) are preferably provided to limit pivotal movement of the vehicle body to about 15° on either side of the normal or "dead ahead" position in which the center line 292 of vehicle body 200 coincides with line A—A.

As discussed above, when steering wheel 202 is released by the vehicle simulator operator, the compressed one of the springs 270 in the two steering return assemblies 258 and 260 will, acting through the associated bracket 250 or 252, spur gear 244, roller chain 242, and sprocket 240, rotate shaft 226 and steering wheel 202 until the latter reaches its neutral or centered position. As friction wheel 288 is fixed to shaft 226, rotation of the latter will cause friction wheel 288 to roll along track 290, pivotally restoring simulated vehicle 200 about pivot post 216 to the neutral position. Thus, steering return mechanisms 258 and 260 are also effective to return vehicle 200 to and maintain it in its neutral or "dead ahead" position.

As will be apparent from the foregoing, there is only a frictional connection between simulated vehicle 200 and base 214; i.e., the friction between friction wheel 288 and arcuate track 290. It is, therefore, relatively easy to displace the neutral axis or center line 292 of simulated vehicle 200 from line A—A. With the simulated vehicle displaced, the operator has a distorted view of the scene projected on the screen 500. For example, the scene may depict a straight segment of road to proceed along which the simulator operator would permit the steering mechanism and the simulated vehicle to remain in their centered or neutral positions so that the simulated vehicle would proceed straight along the displayed road scene. However, with the neutral axis displaced, the simulator operator would experience the sensation that he was proceeding at an angle to the road; and his ensuing reactions would, therefore, be totally unlike those of the operator of an actual dirigible vehicle in the same circumstances.

To prevent inadvertent displacement of the simulated vehicle neutral axis, the novel mechanism illustrated diagrammatically in FIGURES 6 and 7 is employed. This mechanism includes a pulley 294 keyed or otherwise fixed to rotatable shaft 226 between sprocket 240 and friction wheel 288, and two lengths of flexible but inextensible line or cable 296 and 298. Each of the two lengths of cable is fixed at one end to pulley 294. The two lines are wrapped around the pulley in opposite directions for one turn, and the opposite ends of the two lines 296 and 298 are fixed to any convenient stationary object, identified generally in FIGURES 6 and 7 by reference characters 300 and 302. In practice this is the vehicle base 214 but may be any other convenient fixed component of the vehicle simulator system or, if desired, the ends of lines 296 and 298 may be fastened to the floor adjacent the simulated vehicle. When the lines are fastened, the slack is taken up so that they will be taut.

When the simulated vehicle 200 is pivotally displaced from its "dead ahead" position by manipulation of steering wheel 202, pulley 294 will be rotated by shaft 226 unwinding one of the two lines 296 from the pulley 294 and winding the other onto the pulley. Consequently, the sum of the distances CD and DE (FIGURE 7) remain substantially constant as friction wheel 288 rolls along track 290, and the two inextensible lines 296 and 298 remain taut. Since the two lines are taut and oppositely wound on pulley 294, they prevent friction wheel 288 from slipping either to the left or right (as viewed in FIGURE 7) relative to track 290, preventing displacement of vehicle 200's neutral axis 292 relative to line A—A (see FIGURE 4).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle operation simulator;
   a base;
   a simulated vehicle pivotally supported on said base and including operator manipulatable steering means;
   means operative incident to the manipulation of said steering means for pivotally displacing said simulated vehicle from a normally aligned position in which a fiducial line on said vehicle lies in a common plane with a fiducial line on said base to a nonaligned position in which said first mentioned fiducial line lies outside said plane;
   means operatively connected between said steering means in frame of said simulated vehicle for automatically aligning said vehicle absent operator effected displacement of said vehicle from its aligned position; and wherein the vehicle displacing means includes:
      an arcuate track coaxial with the vehicle pivot axis;
      a member rotatably supported in a predetermined relation to the simulated vehicle and in rolling engagement with said track; and
      means drive-connecting said rotatably supported member and said steering means to produce rolling of said member along said track incident to manipulation of said steering means to pivot said vehicle about the vehicle pivot axis.

2. In a vehicle operation simulator;
   a base;
   a simulated vehicle pivotally supported on said base and including operator manipulatable steering means;
   means operative incident to the manipulation of said steering means for pivotally displacing said simulated vehicle from a normally aligned position in which a fiducial line on said vehicle lies in a common plane with a fiducial line on said base to a nonaligned position in which said first mentioned fiducial line lies outside such plane; and
   means operatively connected between said steering means and the frame of said simulated vehicle for automatically aligning said vehicle absent operator effected displacement of said vehicle from its aligned position; and
   restraining means for preventing inadvertent displacement of the aligned position of the vehicle relative to the base, wherein the restraining means comprises:
      a drum rotatable with and about the same axis as said rotatable member; and
      an inextensible flexible line wrapped around and centrally secured to said pulley and the opposite ends of which are fixed relative to said base whereby rotation of said drum in said rotatable member in opposite directions causes like amounts of the opposite end portions of said line to be wound upon and unwound from said drum respectively.

3. In a vehicle operating simulator;
   a base;
   a simulated vehicle pivotally supported on said base and including operator manipulatable steering means;
   means operative incident to the manipulation of said steering means for pivotally displacing said simulated vehicle from a normally aligned position in which a fiducial line on said vehicle lies in a common plane with a fiducial line on said base to a nonaligned position in which said first mentioned fiducial line lies outside said plane;
   means operatively connected between said steering means and the frame of said simulated vehicle for automatically aligning said vehicle absent operator effected displacement of said vehicle from its aligned position; wherein said steering means includes an operator manipulatable steering element and a rotatably mounted shaft fixed to said element, and said aligning means includes oppositely acting resilient biasing means connected between said steering means and said frame of said simulated vehicle; and wherein said automatically aligning means comprises:
      a first member fixed to said shaft;
      a second member spaced from the first member and rotatably supported from the vehicle frame;
      a flexible motion transmitting element drive connecting said first and second members; and
      a pair of compression springs, each fixed at one end to said second member, the opposite ends of said springs abutting spring supports fixed to the vehicle frame, the longitudinal axes of said springs being substantially symmetric relative to a line through the axis of rotation of said second member and a point midway between said spring supports.

References Cited

UNITED STATES PATENTS

| | | | |
|---|---|---|---|
| 1,026,333 | 5/1912 | Van Sant | 272—37 |
| 1,773,936 | 8/1930 | Bertram | 272—1 |
| 2,295,836 | 9/1942 | Fernald | 35—12 |
| 2,373,653 | 4/1945 | Barber | 35—12 |
| 2,661,954 | 12/1953 | Koci | 272—1 |
| 2,695,783 | 11/1954 | Serafin | 35—12 XR |
| 3,107,437 | 10/1963 | Larham et al. | 35—11 |
| 3,219,344 | 11/1965 | Tober | 272—37 |

EUGENE R. CAPOZIO, Primary Examiner

W. W. NIELSEN, Assistant Examiner